United States Patent [19]

Decker et al.

[11] 4,228,682
[45] Oct. 21, 1980

[54] VARIABLE CABLE HOISTING SYSTEM HAVING QUICK DISCONNECT DEADLINE LOAD INDICATING APPARATUS

[75] Inventors: Elmer L. Decker, Long Beach; James Moon, Santa Ana; Paul R. Maxwell, Bakersfield, all of Calif.

[73] Assignee: Decker Engineering Corporation, Long Beach, Calif.

[21] Appl. No.: 966,381

[22] Filed: Dec. 4, 1978

[51] Int. Cl.³ .............................................. G01L 5/04
[52] U.S. Cl. .................................................... 73/143
[58] Field of Search ..................... 73/143, 151; 212/2; 254/173 B

[56] References Cited

U.S. PATENT DOCUMENTS

| | | | |
|---|---|---|---|
| 2,488,070 | 11/1949 | Spalding | 73/143 |
| 3,056,287 | 10/1962 | Gillett | 73/143 |
| 3,973,435 | 8/1976 | Decker et al. | 73/143 |

Primary Examiner—Charles A. Ruehl
Attorney, Agent, or Firm—Paul A. Weilein

[57] ABSTRACT

A unique variable cable hoisting system utilizing a deadline load indicating apparatus in which the end terminus of the deadline is releasably anchored to a snubbing drum of the load indicating apparatus by quickly releasable hinge members which serve to restrain the end terminus against lateral movements and also to provide an abutment for engaging an abutment on the cable end terminus for opposing its axial movement under load forces and anchoring it to the snubbing drum of the deadline load indicating apparatus, when the cable system is being operatively utilized as a single fastline system. The quickly releasable feature concept, however, permits the terminus end of the deadline to be quickly detached from the snubbing drum and attached to a main hoisting drum as a second fastline to provide a double fastline hoisting system having the capability of doubling the hoisting speed.

11 Claims, 4 Drawing Figures

VARIABLE CABLE HOISTING SYSTEM HAVING QUICK DISCONNECT DEADLINE LOAD INDICATING APPARATUS

PRIOR ART

In the prior art there are numerous embodiments of single fastline cable systems in which a deadline is anchored to a load stress indicating apparatus in a manner which permits the deadline to be either terminated or carried to a supply or storage drum. The closest art known to applicants are the following U.S. Pat. Nos.: 1,578,518, Mar. 30, 1926 2,061,863, Nov. 24, 1936 2,253,279, Mar. 18, 1941 2,488,070, Nov. 15, 1949 2,807,957, Oct. 1, 1957 2,984,103, May 16, 1961 3,004,558, Oct. 17, 1961 3,056,287, Oct. 2, 1962 3,192,768, July 6, 1965 3,298,226, Jan. 17, 1967 3,382,713, May 14, 1968 3,538,764, Nov. 10, 1970 3,973,435, Aug. 10, 1976 3,999,427, Dec. 28, 1976

BACKGROUND OF THE INVENTION

The present invention relates generally to cable hoisting systems.

For many years, it has been a conventional practice to utilize a single fastline cable hoisting system in which a deadline was connected to a fixed snubbing drum, and a wireline deflection type of weight indicator connected to the deadline.

In such a system, the current procedure, in order to obtain a faster hoisting speed for removal and replacement of sucker rods and tubing in a producing well, includes the practice of disconnecting the deadline from the fixed snubbing drum and attaching it to the main hoisting drum so as to provide a double fastline hoisting system with twice the hoisting speed of the single fastline system. This changeover is a cumbersome and time consuming operation necessitating the disconnection and reconnection of the wireline deflection indicator.

Having in mind the difficulties and inconvenience of the foregoing arrangement, the present envisions the use of a quick means for attaching and detaching the terminus end of the deadline to the snubbing drum of a conventional type weight indicator and drilling line anchor apparatus such as exemplified by the early Spalding U.S. Pat. No. 2,488,070 or the later Decker et al U.S. Pat. No. 3,973,435.

The improved cable attaching means according to the present invention increases the scope of use of the deadline anchor and weight indicating apparatus, and permits its embodiment into any one of three operating systems, as follows:

1. In which the deadline feeds from the anchor apparatus to a storage drum.
2. In which the deadline is anchored directly to the snubbing drum, the storage drum being omitted.
3. In which the deadline is releasably connected to the snubbing drum so as to operate the weight indicator in a normal manner, but may be quickly detached and connected to the main hoisting drum to provide a double fastline system with double hoisting speed, during which the anchor apparatus and its weight indicating means remained inactive.

SUMMARY OF THE INVENTION

The present invention is more specifically concerned with improvements in the means for anchoring a deadline of a cable hoisting system to the snubbing drum of weight indicating apparatus.

It is one object of the present invention to provide a variable cable hoisting system in which a single fastline hoisting system having a deadline anchor and weight indicating apparatus may be quickly converted to a double fastline system.

A further object resides in the provision of an improved deadline anchor and weight indicating apparatus which is susceptible of use in a single fastline hoisting system, but which permits of quick release of the anchored deadline for connection with a hoisting drum to provide a double fastline hoisting system.

Another object is to provide an improved deadline anchor and weight indicating apparatus having a plurality of selectable cable anchor means for accommodating the apparatus to different operating conditions, and in which one of the anchor means has quick connection and disconnection capabilities.

It is also an object to provide in a weight indicating anchor apparatus for a deadline, a quick acting means for attaching and detaching a cable end terminus to a snubbing drum thereof.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only.

DESCRIPTION OF A PREFERRED EMBODIMENT

Figure 1:
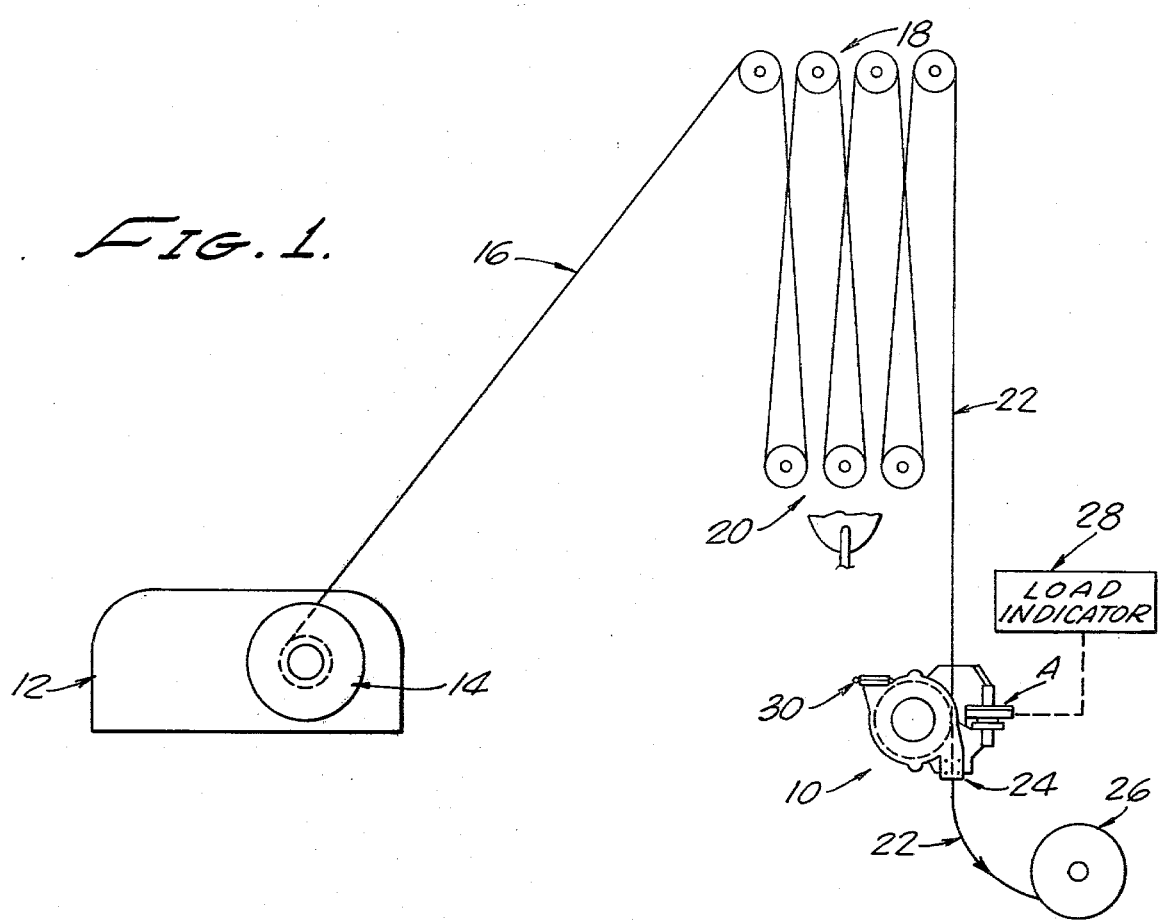
FIG. 1 is a view diagrammatically illustrating a conventional single fastline hoisting system, and in which the deadline is connected with an anchor apparatus having a load indicator, the deadline leading to a storage drum.

Referring more specifically to the drawings, there is diagrammatically illustrated in FIG. 1 a conventional single fastline hoisting system which includes a deadline anchor and weight indicating apparatus, as generally indicated at 10, embodying the features of the present invention.

More specifically, this single fastline hoisting system contains a typical drawworks 12 having a main hoisting drum 14 which is shown as being operatively connected at one end to a single fastline 16 that is trained over the sheaves of a crown block structure 18, the sheaves of a travelling block structure 20, and thence into a deadline 22. This deadline is connected with the anchor apparatus 10, as will hereinafter be explained more fully, in which it may be secured by anchor means 24 either to dead end the deadline or permit its continuing to a storage drum 26. As thus arranged, the system operates in the usual manner with the load forces on the deadline being sensed by a sensing unit A that is operatively connected with an appropriate type of load indicator 28.

Figure 2:
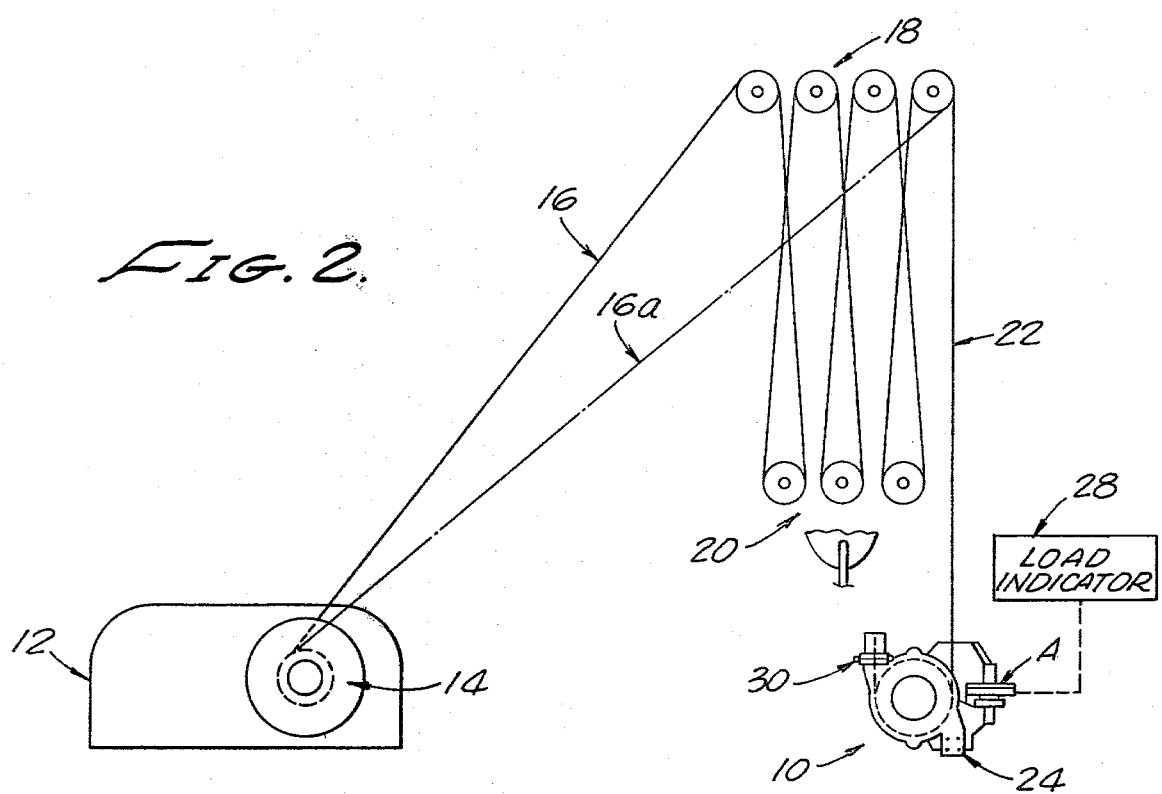
FIG. 2 is a similar view showing a single fastline hoisting system in which the load indicating anchor apparatus contains a releasable end terminus attaching means according to the present invention, and illustrating the manner in which the deadline may be connected to the main hoist to provide a double fastline hoisting system.

FIG. 2 illustrates the manner in which the end terminus of the deadline 22 may be releasably anchored by the improved anchor means 30 embodying the features of the present invention, to permit the deadline 22 to be detached from the anchor apparatus 10 and reconnected by known conventional means with the other end of the main hoisting drum 14 so as to provide a second fastline 16a and thus form a double fastline hoisting system in which the hoisting speed will be twice that of the single fastline hoisting system. As thus connected, the sensing unit A is inactivated during the double fastline operation.

Figure 3:
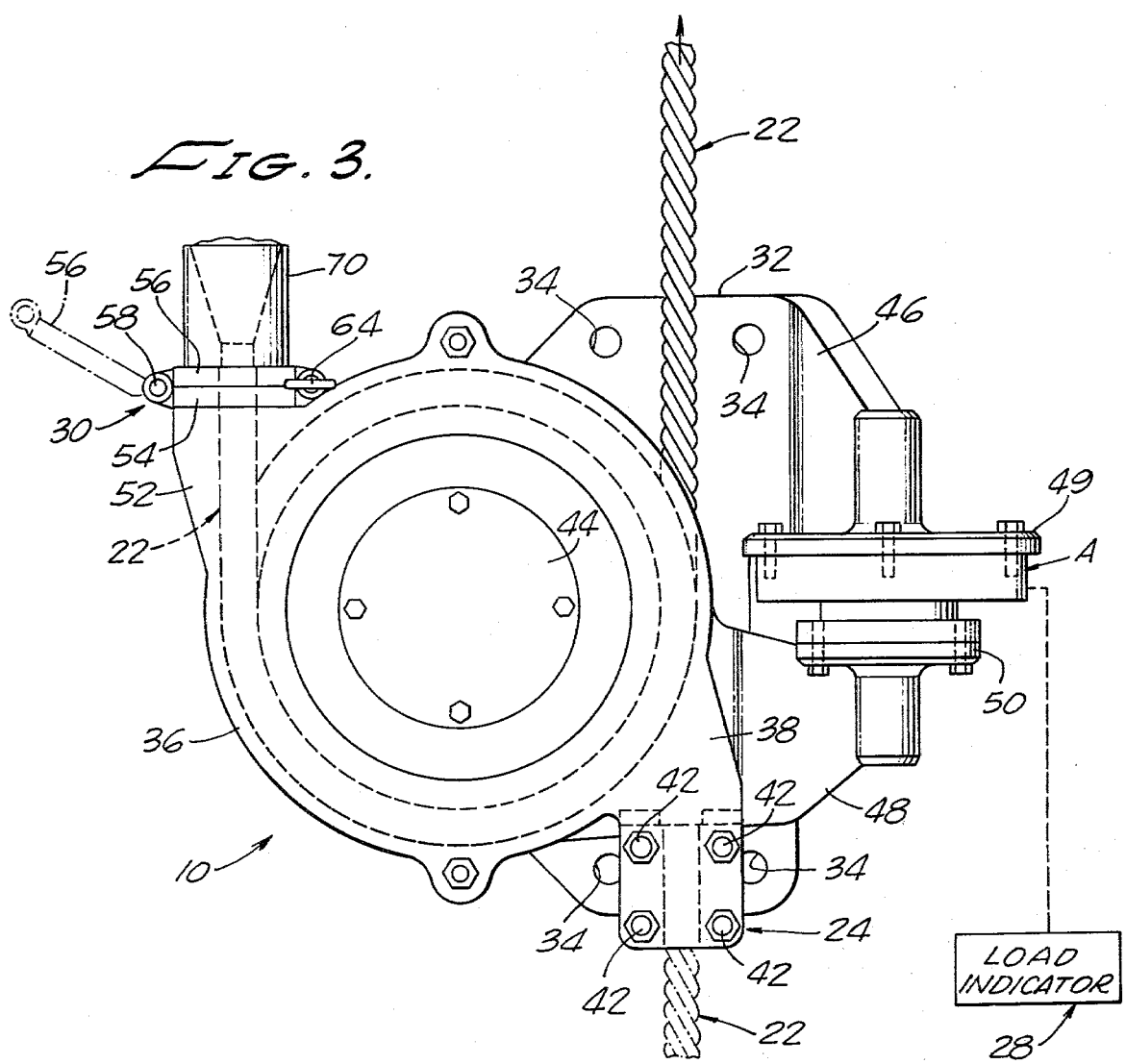
FIG. 3 is an enlarged side elevational view of anchoring apparatus according to the present invention, and showing details of the quick releasable cable attaching means.
Figure 4:
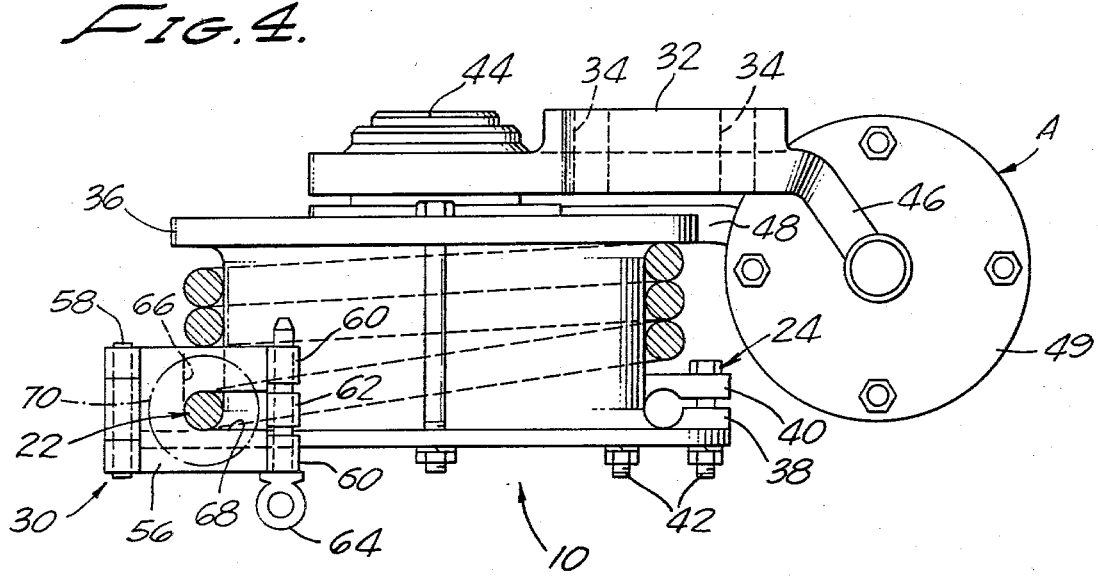
FIG. 4 is a top plan view of the same.

Referring now to FIGS. 3 and 4, the anchor apparatus 10 may vary somewhat as to details of construction, but basically perform similar operating functions. Briefly, the illustrated anchor apparatus 10 comprises a base 32, which in the present embodiment is arranged for mounting on the face of a vertically extending structural member as by suitable openings 34 which are adapted to receive appropriate mounting bolts, not shown. The base 32 mounts a rotatable snubbing drum 36 around which is wound a number of turns of the deadline 22 of the hoisting system. A rigid arm 38 carried by the drum is formed to coact with a clamping block 40 secured by clamping bolts 42 to provide the anchor means 24 for the deadline 22 which may either be dead ended at this point or carried on to the storage drum 26 as shown in FIG. 1.

The base 32 is extended upwardly beyond an axis of rotation 44 of the drum 36, where it is shaped to provide a fixed arm extension 46. The drum 36 is constructed to provide an arm extension 48 which is movable with the drum in response to the application of load forces to the deadline 22.

The arms 46 and 48 are in spaced apart substantially parallel relation, and as arranged are relatively movable towards each other under the applied load forces on the deadline 22. These arms are respectively provided with opposed plate members 49 and 50 which are affixed to their associated arms and between which the load sensing unit A is operatively supported. The load sensing unit may be of the hydraulic type, electronic type, or a combination of the two.

As thus far described, the construction of the anchor apparatus 10 is conventional. This structure, however, has been modified to provide the additional anchor means 30 which, with the previously described anchor means 24, provides a plurality of selectable anchor means which will enable the anchor apparatus 10 to be utilized in a conventional single fastline hoisting system in which the load forces on the deadline will be indicated as illustrated in FIG. 1, or quickly converted to a double fastline system as indicated in FIG. 2 in which the load sensing unit will be inactive.

More specifically, the anchor means 30 comprises a unique arrangement of parts which may be quickly utilized to attach and detach the end terminus of the deadline to the snubbing drum 36. For such purpose, the drum is provided with a second rigid arm 52 which terminates in a transversely extending plate 54 that is operatively associated with a plate 56 to provide a pair of hinged plate members, these members being hingedly interconnected along one set of their adjacent edges for swinging movement by means of a hinge pin 58. As thus arranged, the plate 54 comprises a fixed plate, while the plate 56 comprises a hinged plate which may be swung into parallel engaged closed contact with the plate 54 or to a disengaged open position as indicated in phantom lines. At their opposite set of edges, the plates 54 and 56 are provided with tubular sleeve portions 60 and 62 which are adapted to axially register in the closed position of the plates, and in which position they may be secured by means of a removable locking pin 64.

As shown in FIG. 4, the plates 54 and 56 are respectively provided with open ended slots 66 and 68 which are adapted in the closed position of the plate members 54 and 56 to register in their bottom closed end portions in a manner to embrace the end terminus of the deadline 22 and restrain it against lateral movements in all directions.

It will be seen that the hinged plates in closed position provide an abutment which is adapted to be engaged by a collar or thimble 70 fixedly secured to the end terminus of the deadline. The engagement of the thimble 70 with the hinge plate 56 serves to oppose axial movement of the end terminus of the deadline 22 under the applied load forces. It will be seen that the plate 56 thus operates as a keeper to retain the terminus end of the deadline within the slot 66 of the plate 54. However, when the plate 56 is hinged to open position, the end terminus of the deadline may be removed from the slot 66 and thus permit removal of the deadline from the drum 36, and its reconnection with the main hoist 14, when it is desired to operate the hoisting system as a double fastline system. The anchor apparatus as thus described also has the selective alternative of being operable under conditions in which it may be desired to have the deadline 22 carried to a storage drum 26, in which case the anchor means 24 will be utilized.

From the foregoing description and drawings, it will be clearly evident that the delineated objects and features of the invention will be accomplished.

Various modifications may suggest themselves to those skilled in the art without departing from the spirit of the disclosed invention and, hence, it is not wished to be restricted to the specific forms shown or uses mentioned except to the extent indicated in the appended claims.

What is claimed is:

1. In a hoisting cable system in which a single fastline connected at one end with a main hoist drum is trained over sheaves of a crown block and travelling block and has a deadline portion connected with a cable anchor and weight indicating apparatus, the improvement in which said apparatus is arranged to enable conversion to a double fastline cable system by disconnecting the deadline from said apparatus and its reconnection to the main hoist drum, said apparatus comprising:

an anchoring means fixed on the end of said deadline portion;

a base structure;

a snubbing drum rotatably supported on said base structure and adapted to receive a plurality of loops of the deadline thereon;

said base and snubbing drum respectively having adjacently spaced arm extensions relatively movable in response to tension forces on said deadline;

force sensing and indicating means interconnecting said arm extensions; and means on said snubbing drum for releasably engaging and securing the said anchoring means on the end of said deadline to said snubbing drum and in its released position enabling detachment of the end of the deadline from the snubbing drum and its reattachment to the main hoist drum to effect the double fastline system.

2. A hoisting cable system according to claim 1, in which:
the means for releasably anchoring the end of said deadline comprises:
a hinged member supported on said drum for movement between a cable holding position and a cable release position;
said hinged member in said holding position coacting with an adjacent fixed portion of said drum to restrain the cable end against lateral movements, and with an end collar on the cable to oppose axial movement of the collar and connected cable under applied tension forces.

3. A hoisting cable system according to claim 2, including means for releasably securing said hinged member in said holding position.

4. In deadline cable anchor apparatus having a base structure mounting a rotatable cable snubbing drum, and a weight sensor responsive to relative movement between the base and drum, when a tension force is applied to a deadline cable extending around a portion of the drum, the improvement comprising:
a plurality of selectable means for anchoring a deadline cable to the snubbing drum;
one of said anchoring means being operable to releasably grip a deadline cable supplied from a storage means; and
the other of said anchoring means being operable to anchoring and non-anchoring positions, and in the anchoring position being operative to restrain an end terminus of a deadline cable against lateral movement and against axial movement under the applied tension force, and in its non-anchoring position enabling detachment of the deadline cable from the snubbing drum.

5. Deadline cable anchoring apparatus according to claim 4, in which:
the other of said anchoring means includes an abutment member secured to the end terminus of the cable;
abutment means carried by said snubbing drum, adapted to be engaged by said abutment member; and
said abutment means including parts supported for movement into and out of a position restraining the end portion of the cable against lateral movement.

6. A deadline cable anchor, comprising:
a base structure;
a rotatably mounted snubbing drum on said base;
weight sensing means responsive to relative movements between said base and drum, when a tension force is applied to a deadline cable extending around a portion of said drum;
means for releasably securing an end terminus of the deadline cable to the snubbing drum, comprising:
a first abutment fixedly secured to an end terminus of the deadline cable; and
a quick release means carried by the snubbing drum for attaching the end terminus of the deadline cable to said snubbing drum including a second abutment for engaging and opposing axial movement of the first abutment and the associated cable end terminus by the applied tension force.

7. A cable anchor according to claim 6, in which:
the first abutment comprises a thimble.

8. A cable anchor according to claim 6, in which:
the second abutment comprises a hinged member movable between engaged and disengaged positions in relation to said cable terminus end; and
means for releasably retaining said hinged member in said engaged position.

9. A cable anchor according to claim 6, in which:
the second abutment comprises a pair of hingedly connected plate members, one of said plate members being fixedly secured to the snubbing drum, and the other being swingably movable between abutting and non-abutting positions in respect to said first abutment;
means on said plate members operative in the abutting position to restrain the cable end terminus against lateral movements, and in the non-abutting position release the cable end terminus and permit detachment of the anchored deadline cable from the snubbing drum.

10. A cable anchor according to claim 9, in which:
the cable retaining means includes an open ended cable receiving slot in said fixed member;
and said swingably movable member in the abutting position extends across said slot to form a cable retaining keeper.

11. A cable anchor according to claim 9, in which:
the cable retaining means includes open ended cable receiving slots respectively formed in said plates;
said slots being in right angled relation and relatively so positioned that in said abutting position the cable at the terminus end will be restrained in the closed end portions of the slots against lateral movement in all directions.

* * * * *